United States Patent [19]
Nobutoki et al.

[11] Patent Number: 5,289,466
[45] Date of Patent: Feb. 22, 1994

[54] MULTIPLEX TRANSMISSION METHOD

[75] Inventors: Yoshikazu Nobutoki, Higashihiroshima; Shigeyuki Satomura, Kure; Masao Hideshima; Akira Sone, both of Hiroshima, all of Japan

[73] Assignee: Mazda Motor Corporation, Hiroshima, Japan

[21] Appl. No.: 858,531

[22] Filed: Mar. 27, 1992

[30] Foreign Application Priority Data

Mar. 27, 1991 [JP] Japan .................................. 3-063312

[51] Int. Cl.$^5$ ........................................... H04L 12/40
[52] U.S. Cl. ................... 370/85.2; 340/825.5; 370/85.6
[58] Field of Search ............ 370/85.2, 85.3, 85.6, 370/85.1, 108, 100.1, 103; 340/825.5, 825.51, 825.06, 825.14

[56] References Cited

U.S. PATENT DOCUMENTS

| | | | |
|---|---|---|---|
| 4,412,326 | 10/1983 | Limb | 370/85.3 |
| 4,942,571 | 7/1990 | Möller et al. | 370/85.1 |
| 5,090,012 | 2/1992 | Kajiyama et al. | 370/85.3 |

FOREIGN PATENT DOCUMENTS 61-224634 10/1986 Japan .

Primary Examiner—Wellington Chin

[57] ABSTRACT

In a multiplex transmission method, refresh transmission operations at a predetermined period, and event transmission operations are time-divisionally performed in a multiplex transmission mode, and a predetermined non-transmission time is set before start of each refresh transmission operation. When another transmission operation is performed within the non-transmission time, a communication is performed, while the predetermined period of the refresh transmission operations is properly permitted to be delayed to assure the non-transmission time for such a communication state.

8 Claims, 8 Drawing Sheets

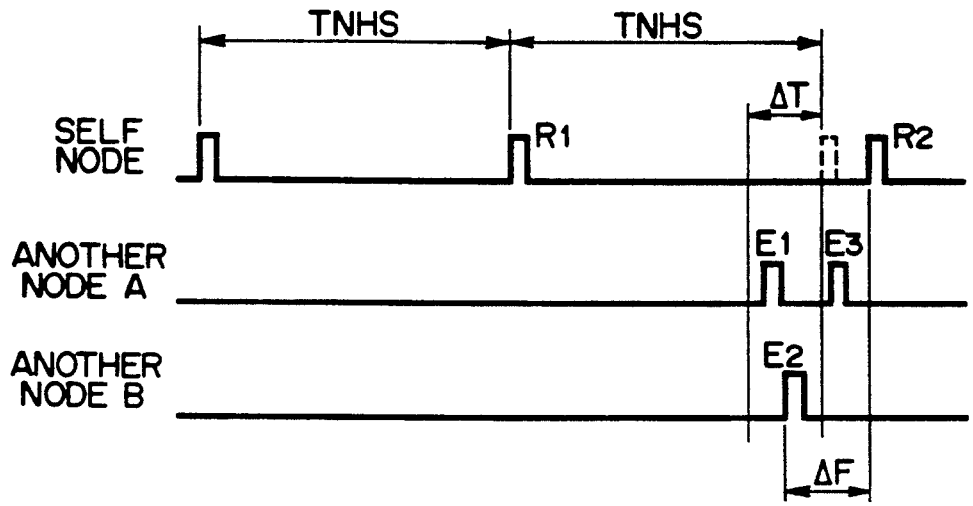
F I G. 5
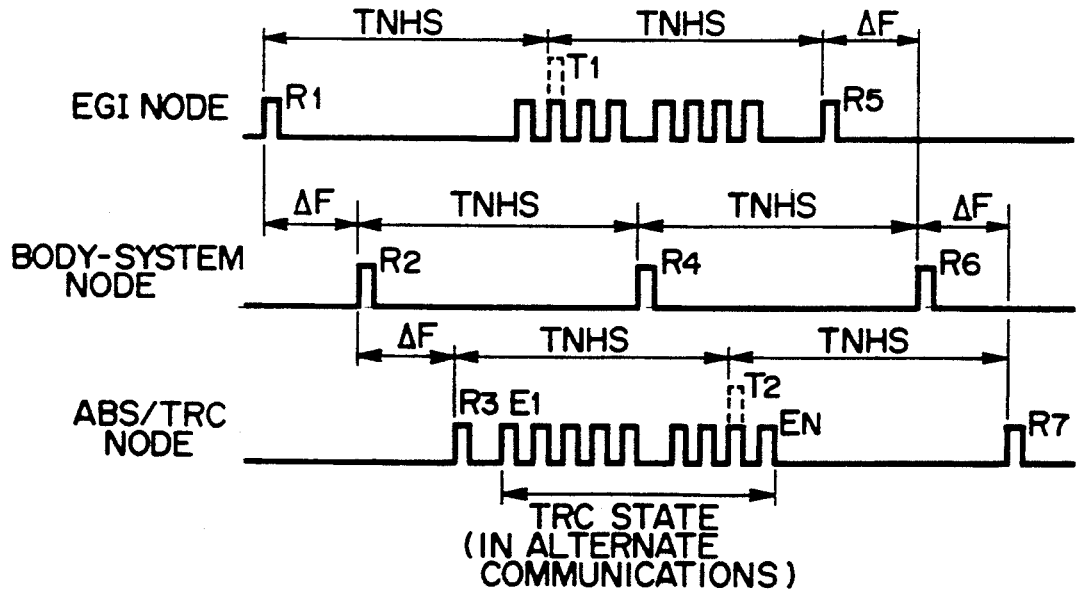
F I G. 6

MULTIPLEX TRANSMISSION METHOD

BACKGROUND OF THE INVENTION

The present invention relates to a multiplex transmission method used in, e.g., a vehicle and, more particularly, to a distributed control type multiplex transmission method, wherein each communication node performs a refresh transmission operation during a corresponding transmission period, and has a clock to manage its own transmission timing based on the clock.

In recent vehicles, the number of electronic devices equipped in a vehicle is considerably increased along with the development of electronic control, and this results in an increase in the number of wiring lines for connecting the electronic devices, and a complicated wiring structure. In order to solve these problems, as disclosed in, e.g., Japanese Laid-Open Patent Application No. 61-224634, a multiplex transmission method has been examined, and is beginning to be put into practical applications. In this method, signal transmission operations among a plurality of electronic devices are performed in a multiplex transmission mode, i.e., communication nodes of the plurality of electronic devices are connected to a common transmission path, and signal transmission operations among the communication nodes are performed in the multiplex transmission mode.

As a multiplex transmission method of this type, the following time-divisional distributed control type multiplex control method is known. More specifically, each communication node performs a so-called refresh transmission operation, i.e., transmits a signal for informing its own information at every predetermined transmission period, and transmits its own information at every predetermined period regardless of a change in its own information, thus assuring reliability of data. At the same time, each communication node performs a so-called event transmission operation for, when its own information changes, immediately informing the changed information, as needed. Each communication node has its own clock, and manages its own transmission timing based on the clock.

As described above, in the distributed control system wherein each communication node has its own clock, and independently manages its own transmission timing according to the clock, a control program is relatively simple, and a communication node can be easily added.

However, the refresh transmission operation of the above-mentioned distributed control system suffers from the following problem. That is, the refresh transmission interval is decreased due to an error among clocks of the communication nodes, and signals are crowded on a transmission path, resulting in an increase in traffic amount. As a result, a transmission disabled or delayed state occurs due to signal collision.

More specifically, in the refresh transmission mode, a predetermined time interval is initially set between refresh transmission timings of the communication nodes, and each communication node repeats the refresh transmission operations at the predetermined transmission period on the basis of its own clock.

In this case, if the clock is perfectly precise, the time interval can always be assured, and no problem is posed. However, each clock has limited precision, and suffers from a time measurement error. For this reason, the refresh transmission timings approach very close to each other, or refresh transmission signals collide against each other several hours after the multiplex transmission operation is started.

When the refresh transmission timings approach each other, and the traffic amount is increased, not only refresh transmission signals collide against each other to cause a transmission disabled or delayed state, but also when an event transmission operation must be performed when the traffic amount is increased, the event transmission operation also suffers from a transmission disabled or delayed state due to collision.

Furthermore, when an event transmission operation is performed immediately before a refresh transmission operation, the interval between the event and refresh transmission operations is decreased, and the traffic amount is increased, thus causing a transmission disabled or delayed state of another event transmission.

SUMMARY OF THE INVENTION

The present invention has been made in consideration of the above situation, and has as its object to provide a multiplex transmission method in which each communication node has a clock to manage its transmission timing, and performs a refresh transmission operation at a predetermined transmission period, wherein a substantially uniform non-transmission interval is assured between adjacent refresh transmission timings, thereby preventing a transmission disabled or delayed state due to an increase in traffic amount.

In order to achieve the above object, in a multiplex transmission method according to the present invention, time-divisional distributed multiplex transmission operations are performed among a plurality of communication nodes each having a clock for managing its own transmission timing, and each communication node performs a refresh transmission operation at a predetermined period. Each communication node sets a non-transmission time having a predetermined duration before it starts the refresh transmission operation, and when a transmission operation of another communication node is performed within the non-transmission time, the communication node delays its own refresh transmission period by a predetermined period of time to assure the non-transmission time.

Preferably, when a refresh transmission operation of another communication node is performed within the non-transmission time, each communication node delays its own refresh transmission period by a predetermined period of time to assure the non-transmission time.

Preferably, when an event transmission operation of itself or another communication node is performed within the non-transmission time, each communication node delays its own refresh transmission period by a predetermined period of time to assure the non-transmission time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a timing chart showing another delayed refresh transmission state;

FIG. 6 is a timing chart showing a refresh transmission state when alternate communications occur;

DETAILED DESCRIPTION OF THE PREFERRED EMBODIMENT

The preferred embodiment of the present invention will now be described with reference to the accompanying drawings. The embodiment to be described below employs a network access method called a CSMA/CD-AMP system, as a multiplex transmission method for a vehicle. The CSMA (Carrier Sense Multiple Access) means a system wherein each communication node confirms a ready state of a transmission path upon generation of a transmission request, and performs transmission, and the CD (Collision Detection) is a system wherein each communication node monitors transmission signals on a transmission path, and performs re-transmission control upon detection of collision of signals. The AMP (Arbitration on Message Priority) means a system wherein a message having a high priority is transmitted without being destroyed upon collision of signals.

<Multiplex Transmission Apparatus>

Figure 1:
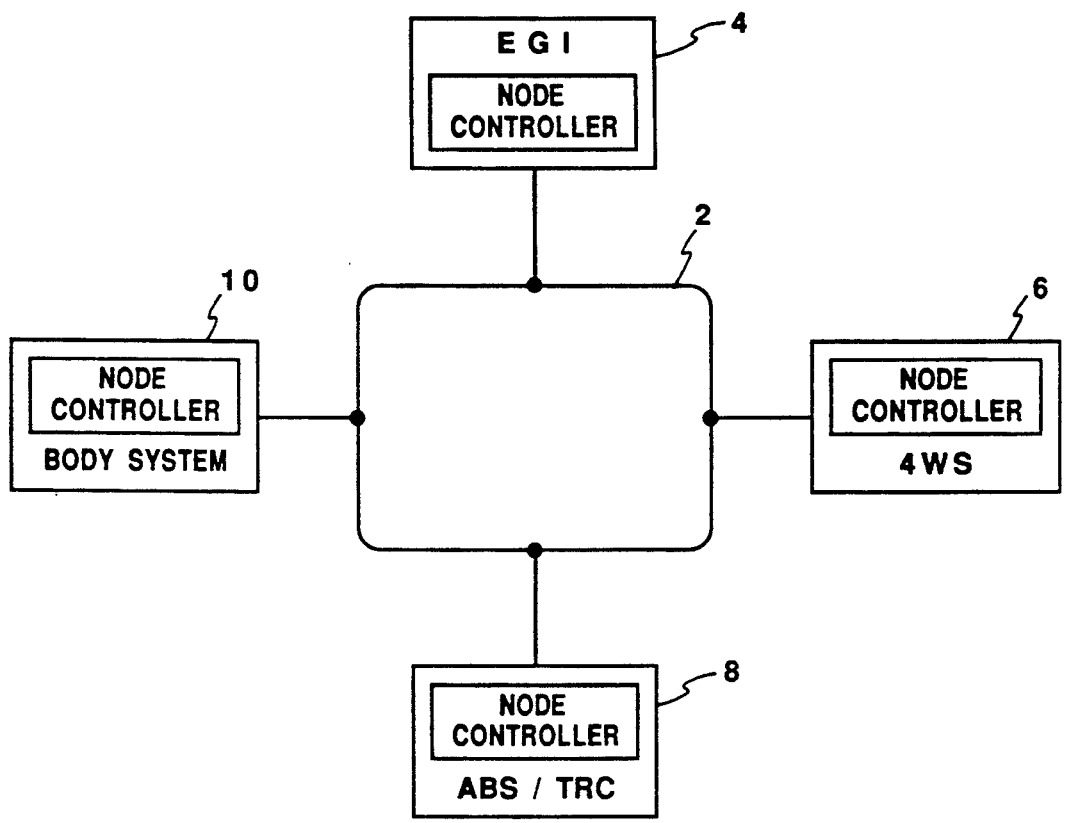
FIG. 1 is a schematic block diagram showing an arrangement of a multiplex transmission apparatus according to an embodiment of the present invention.

FIG. 1 is a schematic block diagram showing the arrangement of a multiplex transmission apparatus according to this embodiment. The apparatus shown in FIG. 1 has a common transmission path (bus) 2 comprising loop-like twisted pair lines. The transmission path 2 is connected to four multiplex communication nodes. The four communication nodes include an EGI node 4 having an EGI controller for performing engine control, a 4WS node 6 having a 4WS controller for performing four-wheel steering control, an ABS/TRC node 8 having an ABS/TRC controller for performing slip control of wheels, and a body-system node 10 having a controller for controlling switches associated with a body.

Signal transmission operations among the communication nodes 4, 6, 8, and 10 are performed via the transmission path 2 in a multiplex transmission mode based on a time-divisional distributed control system, and the above-mentioned CSMA/CD-AMP system.

<Signal Frame>

Figure 2:
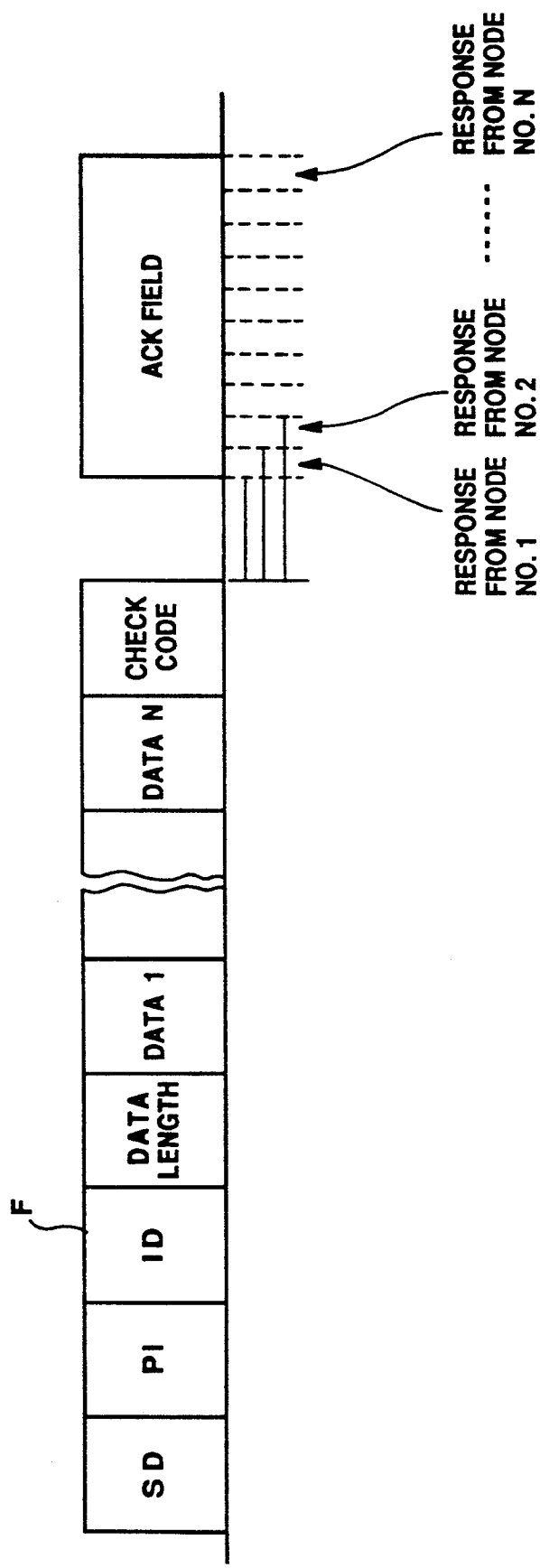
FIG. 2 shows a format of a signal frame in a multiplex transmission mode.

In the above-mentioned signal transmission operation, each of the communication nodes 4, 6, 8, and 10 transmits information of its own node, e.g., various pieces of vehicle drive information or control information using a signal frame F having a format shown in FIG. 2 in units of frames, and the remaining nodes receive the frame F. The frame F has an SD code, a PI code, an ID code, a data length, data 1 to data N, and a check code.

The "SD (Start Delimiter) code" is a specific code representing the start of the frame F. Upon reception of the SD code, each node can recognize the start of the frame F. The "PI (priority) code" is a code indicating a priority order for instructing a signal to be preferentially processed when a plurality of communication nodes simultaneously transmit data, and signals collide against each other. In this embodiment, a lower bit value indicates a higher priority. This is because a low level corresponds to WIRED-OR in the transmission path 2.

If signals are simultaneously transmitted from a plurality of nodes, the "PI code" of a node having a high priority remains on the transmission path 2. For this reason, a node having a low priority detects collision since its own "PI code" is replaced with another code, and re-transmits its own unsuccessful frame.

The "ID (frame ID) code" is a code indicating a transmission source of the corresponding frame. The "data length" is written with the number of following data. For example, if N data follow, N is sent as the data length. A node, which received the frame F, reads the data content by only the data length. The "data 1 to data N" are written with various pieces of information to be transmitted in the frame F. A field following the data is the "check code" (CRC check code; error detection code). Upon reception of this code, a node can detect the end of the frame.

<ACK Field>

When each communication node transmits the signal frame F, it sends an "ACK field (reception acknowledge signal field)" onto the transmission path 2. This field consists of bits (4 bits since the four communication nodes are connected in this embodiment) corresponding in number to communication nodes connected to the transmission path 2, and a predetermined inherent bit region is assigned to each communication node. Each communication node acknowledges normal reception of the frame F using the corresponding bit region of the ACK field. More specifically, a communication node (transmission node), which transmits the signal frame, sets "0" in the corresponding bit region of the ACK field upon transmission of the signal frame, and sends it onto the transmission path after the signal frame.

On the other hand, a communication node (reception node), which receives this signal frame, checks if the contents of the data 1 to N in the received frame include an error. If no error is found, the reception node sets "1" in the corresponding inherent bit region, and transmits it as a reception acknowledge signal (ACK signal). In this case, the transmission node receives the ACK signal simultaneously with transmission of the signal frame F, and if it can normally receive the signal frame, it sets "1" in the bit region in the ACK field inherent to the transmission node.

Therefore, when the communication nodes normally receive the transmitted signal frame, all the bit regions of the ACK field on the transmission path 2 are set with "1". If any of reception nodes cannot normally receive the signal frame, the bit region inherent to this reception node remains to be "0". Therefore, the transmission node receives this ACK field to check if the reception nodes normally received the signal frame, and if the transmission node determines that any of the reception nodes has not received the signal frame, it re-transmits the same signal frame.

<Refresh Transmission & Event Transmission>

The refresh and event transmission modes of the communication nodes will be described below. Each communication node performs a refresh transmission operation. The refresh transmission operation is performed based on a time-divisional multiplex transmission system. Each communication node has its own clock, and manages its refresh transmission timing based on the clock, i.e., an independently distributed control system is employed.

Figure 3:
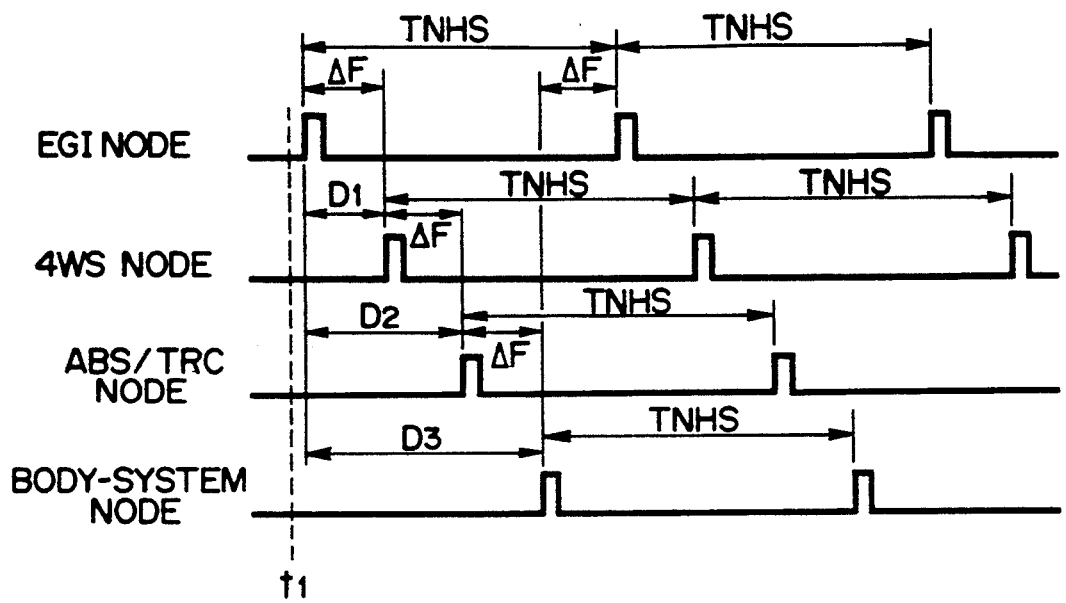
FIG. 3 is a timing chart showing a refresh transmission state.

The refresh transmission operation will be described in detail below with reference to the timing chart shown in FIG. 3. In FIG. 3, a multiplex communication control state is attained at a time $t_1$, and the communication nodes start refresh transmission operations. In this case, the first refresh transmission timings of the nodes are managed by one of the nodes, e.g., the EGI node, which serves as a master node.

When a power switch is turned on, and the multiplex communication control state starts, the EGI node performs its first refresh transmission operation (in FIG. 3, an upward projecting pulse indicates transmission), and causes the 4WS node to perform the first refresh transmission operation after an elapse of a predetermined delay time $D_1$ from the refresh transmission of the EGI node. The EGI node causes the ABS/TRC node to perform the first refresh transmission operation after an elapse of a predetermined delay time $D_2$. Furthermore, the EGI node causes the body-system node to perform the first refresh transmission operation after an elapse of a predetermined delay time $D_3$.

The delay times $D_1$ to $D_3$ are set, so that a shift time between adjacent refresh transmission operations becomes an equal shift time $\Delta F$, as shown in FIG. 3. Note that since the shift time $\Delta F$ includes a frame transmission time (corresponding to the pulse width in FIG. 3), it is different from a non-transmission time in a strict sense. However, since the frame transmission time is very short, the non-transmission time ignores the frame transmission time in the following description. Therefore, in the above-mentioned case, a non-transmission time between adjacent refresh transmission operations is equal to the shift time $\Delta F$.

After the respective nodes perform their first refresh transmission operations, as described above, each node measures a refresh transmission timing based on its own clock, and performs the next refresh transmission operation every time a predetermined transmission period TNHS elapses. The relationship between the period TNHS and the time $\Delta F$ is expressed by TNHS = N × $\Delta F$ (where N is the number of communication nodes connected to the transmission path).

Although not shown in FIG. 3, each communication node performs an event transmission operation, as needed, as well as the refresh transmission operation. In the event transmission operation, as described above, when information of a given node is changed, the given node immediately transmits the changed information independently of the refresh transmission operation.

In the above-mentioned distributed control multiplex transmission system, as described above, the interval between adjacent refresh transmission timings is decreased due to errors of clocks of the nodes, and the traffic amount is increased, resulting in a transmission disabled or delayed state due to collision of refresh or event transmission signals. When such signal collision occurs, a signal having a high priority is transmitted according to the above-mentioned priority (PI code) of a signal, and a signal having a low priority is re-transmitted, thereby solving the above-mentioned problem. However, it is desirable to avoid such signal collision as much as possible. In particular, in the event transmission operation, when information is changed, i.e., when the event transmission is necessary, it is desirable to be able to transmit information without colliding against other signals.

In the multiplex transmission apparatus according to this embodiment, a change in transmission period of refresh transmission is permitted to uniform the non-transmission time, thereby preventing an increase in traffic amount. Thus, refresh transmission signals can be prevented from colliding against each other, and the probability of performing an event transmission operation, as needed, can be improved.

<Delay of Refresh Transmission Timing>

When the refresh transmission operation is performed, a change in transmission period of each refresh transmission operation is temporarily permitted, thereby setting a predetermined reference non-transmission time before each refresh transmission operation. The refresh transmission timing is delayed to assure at least the predetermined reference non-transmission time. More specifically, each communication node monitors signals on the transmission path 2, and when the node performs a refresh transmission operation, it checks if another signal transmission operation was performed within the reference non-transmission time after its immediately preceding refresh transmission timing. If no signal transmission operation is detected, the node performs the refresh transmission operation at its transmission timing (the transmission timing at the predetermined transmission period); if another signal transmission operation is detected, the node performs the refresh transmission operation after an elapse of at least the reference non-transmission time from the detected signal transmission operation.

Figure 4:
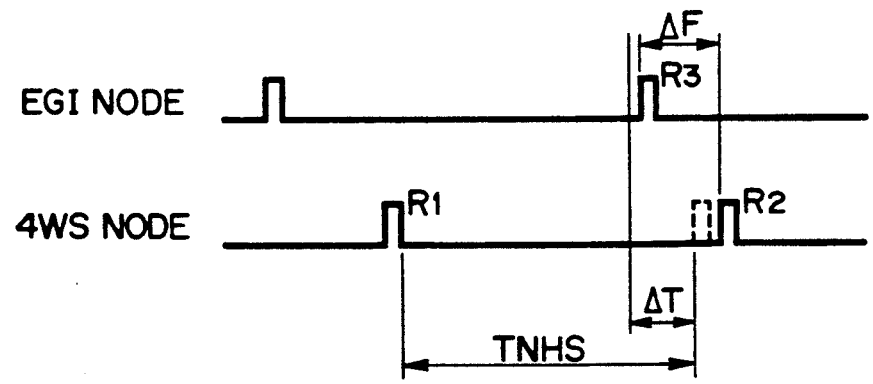
FIG. 4 is a timing chart showing a delayed refresh transmission state.

A case will be described in detail below with reference to FIG. 4, wherein only a refresh transmission operation is considered as another signal transmission operation performed within the reference non-transmission time.

Assume that the 4WS node performs the next refresh transmission operation R2 indicated by a dotted line since the predetermined transmission period TNHS elapses from the immediately preceding refresh transmission operation R1. In this case, the 4WS node checks if another refresh transmission operation was performed during a predetermined reference non-transmission time $\Delta T$ ($\Delta T \leq \Delta F$) before the transmission timing of the refresh transmission operation R2 indicated by the dotted line. For example, as shown in FIG. 4, if a refresh transmission operation R3 of the EGI node was performed within the above-mentioned reference non-transmission time $\Delta T$ due to an error of a clock, the 4WS node performs transmission after an elapse of a proper time equal to or longer than $\Delta T$ from the refresh transmission operation R3 within the reference non-transmission time $\Delta T$, i.e., the shift time $\Delta F$ like in this embodiment. Of course, the refresh transmission timing is delayed only when another transmission is performed within the reference non-transmission time $\Delta T$; otherwise, the refresh transmission operations are repeated at the predetermined transmission period TNHS.

As described above, a change in transmission period of refresh transmission operations (delay of the refresh transmission timing) is permitted to assure at least the reference non-transmission time $\Delta T$ before each refresh transmission operation. Thus, collision between refresh transmission signals can be avoided. Since at least the reference non-transmission time $\Delta T$ can be assured between adjacent refresh transmission operations, non-transmission intervals on the transmission path 2 can be uniformed, and the probability that information can be immediately transmitted without colliding against another signal when event transmission must be performed, can be improved. In other words, since the reference non-transmission time $\Delta T$ is assured, an increase in traffic amount on the transmission path 2 can be prevented, and collision between signals can be eliminated.

A case will be described in detail below with reference to FIG. 5, wherein not only a refresh transmission operation but also an event transmission operation is considered as another signal transmission operation performed within the reference non-transmission time. In FIG. 5, each of a self node, another node A, and another node B corresponds to any one of the multiplex nodes 4, 6, 8, and 10, and refresh transmission operations are omitted from the illustrations of the nodes A and B.

Assume that the communication node illustrated as "self node" in FIG. 5 performs refresh transmission operations at the predetermined transmission period TNHS, and is about to perform the next refresh transmission operation R2, as indicated by a dotted line, since the transmission period TNHS elapsed from the immediately preceding refresh transmission operation R1. In this case, the self node checks if another signal transmission was performed within the reference non-transmission time $\Delta T$ from the transmission timing of the refresh transmission operation R2 indicated by the dotted line. When an event transmission operation E1 from another node A, and an event transmission operation E2 from another node B were performed within the reference non-transmission time $\Delta T$, the self node starts the next refresh transmission operation R2, as indicated by a solid line, after an elapse of the shift time $\Delta F$ from the latter one of these transmission operations, i.e., the event transmission operation E2.

The refresh transmission period is delayed for only an event transmission operation performed within the reference non-transmission time $\Delta T$, and is not delayed for an event transmission operation performed after the reference non-transmission time $\Delta T$, i.e., after an original refresh transmission timing indicated by the dotted line, e.g., for an event transmission operation E3 by another node A in FIG. 5. In other words, the delay time of the transmission timing of the refresh transmission operation is limited up to $\Delta F$, and since the delay time has an upper limit, as described above, the refresh transmission operation can be prevented from being considerably delayed by event transmission operations, which occur continuously. In this embodiment, the maximum delay allowable time (the upper limit of the delay time) is set to be equal to the shift time $\Delta F$. However, the maximum delay allowable time need not always be equal to $\Delta F$, and may be set within a range that does not disturb control.

In the case of FIG. 5, the event transmission operations E1, E2, and E3 are those by other nodes. However, even when any of these transmission operations is a refresh transmission operation or is an event transmission operation by the self node, the refresh transmission operation R2 is delayed in the same manner as described above.

In this manner, when a transmission operation is performed within the reference non-transmission time $\Delta T$, even if the transmission operation is either a refresh or event transmission operation, the refresh transmission period is delayed with respect to the transmission operation (latter one when a plurality of transmission operations are performed). Thus, at least the reference non-transmission time $\Delta T$ can be assured not only between adjacent refresh transmission operations but also between an event transmission operation and a refresh transmission operation. Furthermore, another event transmission operation can be immediately accepted within a newly assured reference non-transmission time $\Delta T$. As a result, the non-transmission time can be uniformed, and the probability of accepting event transmission operations, as needed, can be increased.

<Refresh Transmission Upon Alternate Communications>

A refresh transmission operation when alternate communications are performed between arbitrary communication nodes will be described below with reference to FIG. 6. In the alternate communications, at least two communication nodes substantially continuously and alternately exchange signals. That is, one communication node transmits a signal, the other communication node receives the signal, and immediately transmits a response signal. Each transmission operation in the alternate communications is the above-mentioned event transmission operation.

Assume that a TRC (traction control) state is set while the EGI node, the body-system node, and the ABS/TRC node perform refresh transmission operations according to the above-mentioned transmission timing delay permission method, and the ABS/TRC node and the EGI node start alternate communications. More specifically, according to the above-mentioned transmission timing delay permission method, the EGI node performs a refresh transmission operation R1, the body-system node performs a refresh transmission operation R2, and the ABS/TRC node performs a refresh transmission operation R3.

Thereafter, the TRC state is set, and the ABS/TRC node performs an event transmission operation E1 for transmitting information associated with the start of TRC control, thereby starting alternate communications between the ABS/TRC node and the EGI node. The alternate communications are terminated by an event transmission operation EN for transmitting information associated with the end of TRC control.

When alternate communications are started during the refresh transmission operations, nodes (the ABS/TRC node and the EGI node) in the alternate communications continue measurement of refresh transmission timings based on the predetermined transmission period (fixed transmission period) TNHS from the refresh transmission operations R1 and R3 immediately before the alternate communications are started, respectively, although they do not actually perform refresh transmission operations. After the alternate communications are terminated, these nodes respectively perform first refresh transmission operations R5 and R7 after the termination of alternate communications after an elapse of the transmission period TNHS from the last refresh transmission timings T1 and T2 (indicated by dotted lines since no refresh transmission operations are actually performed) during the alternate communications. Thereafter, these nodes perform refresh transmission operations according to the normal transmission timing delay permission method.

A node (the body-system node), which is not involved in the alternate communications, performs, during the alternate communications, a refresh transmission operation after an elapse of the fixed transmission period TNHS from the refresh transmission operation R2 immediately before the alternate communications are started. After the alternate communications are terminated, this node performs the first refresh transmission operation R6 after an elapse of the fixed transmission period TNHS from the last refresh transmission operation R4 during the alternate communications. Thereafter, this node performs refresh transmission operations according to the normal transmission timing delay permission method.

In this manner, during the alternate communications, the nodes, which are either involved in or not involved in alternate communications, inhibit refresh transmission operations according to the transmission timing delay permission method, and handle refresh transmission operations based on the fixed transmission period TNHS, so that the correlation between refresh transmission operations of all the communication nodes after the alternate communications can be maintained to be the same as that between refresh transmission operations before the alternate communications. Thus, after the termination of the alternate communications, the refresh transmission operations of the nodes can be continued without being disturbed.

<Refresh Transmission Procedure>

A refresh transmission operation according to the transmission timing delay permission method will be described in detail below with reference to the flow charts shown in FIGS. 7 through 10.

Figure 7:
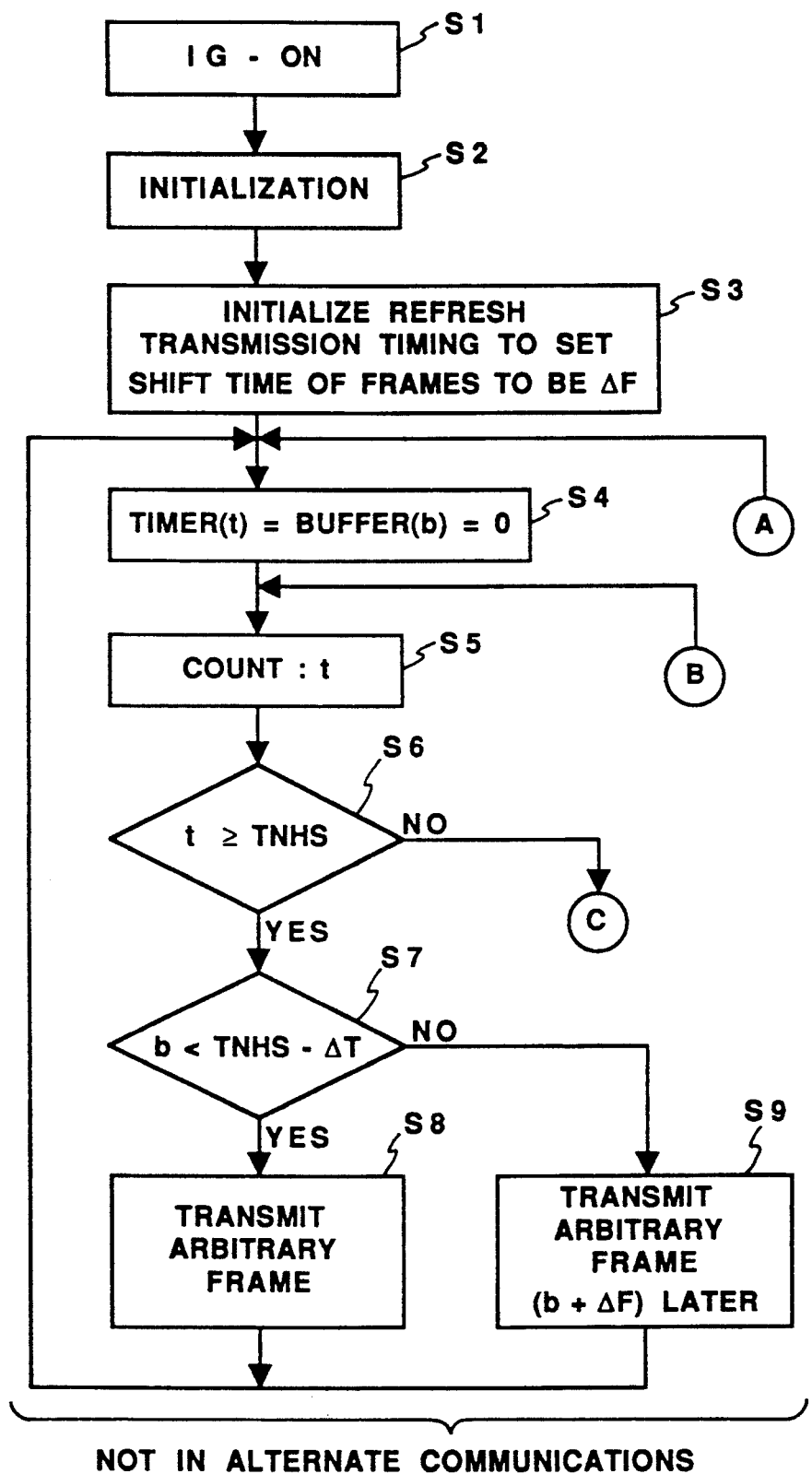
FIGS. 7 and 8 are flow charts showing a refresh transmission sequence of communication nodes that are involved in the alternate communications.
Figure 8:
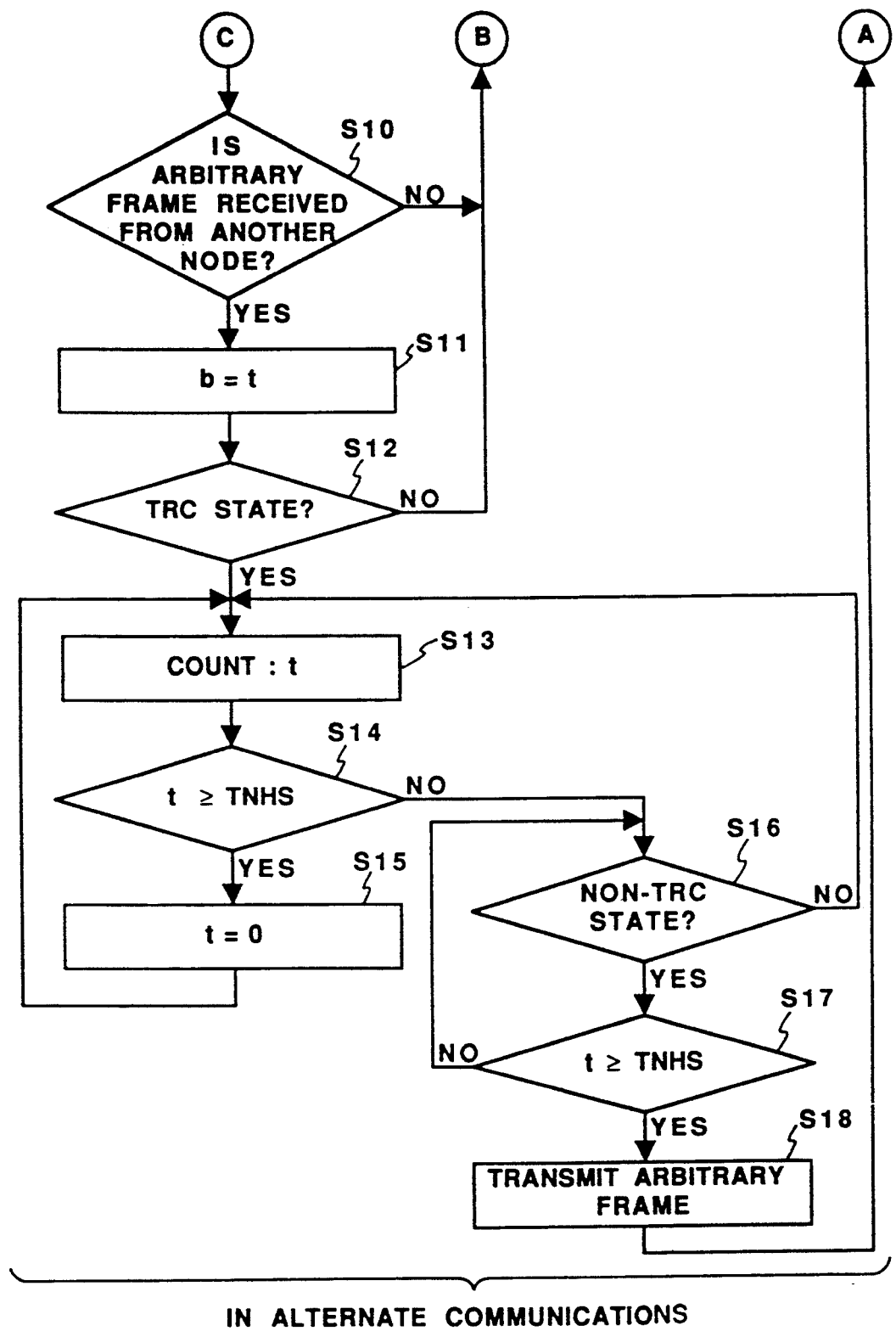

FIGS. 7 and 8 are flow charts showing refresh transmission procedures of nodes, which are involved in alternate communications. When an ignition switch is turned on in step S1 in FIG. 7, each of the nodes, which are involved in alternate communications, performs initialization in step S2, and initializes its refresh transmission timing in step S3, thereby setting a shift time between adjacent refresh transmission frames to be $\Delta F$.

In step S4, the node resets a timer (t) and a buffer (b) to zero. In step S5, the node starts the count operation of the timer (t), and checks in step S6 if a count value t exceeds the predetermined transmission period TNHS. If it is determined in step S6 that the count value t has not reached TNHS yet, the flow advances to step S10 in FIG. 8 to check if an arbitrary signal frame is received from another node. If NO in step S10, the flow returns to step S5; otherwise, the count value t at that time is stored in the buffer (b) in step S11, and it is checked in step S12 if a TRC state is set. If YES in step S12, alternate communications are started. This case will be described later. If NO in step S12, the flow returns to step S5.

In this manner, if $t \geq TNHS$ is satisfied without a TRC state, it is checked in step S7 if $b < TNHS - \Delta T$. The buffer (b) stores the count value obtained when the arbitrary signal frame is received, as described above. When signal frames are received a plurality of number of times, the buffer (b) is updated with a count value obtained upon reception of the last frame. $\Delta T$ is the above-mentioned reference non-transmission time.

Thus, if $b < TNHS - \Delta T$ is satisfied, this means that when the period TNHS elapses, no transmission operation is performed for $\Delta T$ before that time, i.e., the reference non-transmission time $\Delta T$ is assured. Therefore, if $b < TNHS - \Delta T$ is satisfied, an arbitrary signal frame is transmitted in step S8; otherwise, the flow advances to step S9, and an arbitrary signal frame is transmitted after an elapse of $(b + \Delta F)$, i.e., when the count value t reaches $(b + \Delta F)$.

The above-mentioned procedure corresponds to that for a refresh transmission before alternate communications are started. A procedure after the alternate communications are started is as follows.

If it is determined in step S12 that the alternate communications are started, the count operation is continued in step S13, and it is checked in step S14 if the count value t exceeds TNHS. If NO in step S14, it is checked in step S16 if a non-TRC state is set, i.e., the alternate communications are terminated. If NO in step S16, the flow returns to step S13 to continue the count operation. If it is determined in step S14 that the count value t has exceeded TNHS, the flow advances to step S15, and t is reset to 0. Thereafter, the flow returns to step S13 to continue the count operation again. Upon completion of the alternate communications, the flow advances from step S16 to step S17 to check if $t \geq TNHS$. If NO in step S17, the processing operations in steps S16 and S17 are repeated; otherwise, an arbitrary signal frame is transmitted in step S18. Thereafter, the flow returns to step S4.

More specifically, in the multiplex transmission apparatus according to this embodiment, during alternate communications, measurement of the refresh transmission timing is continued based on the fixed transmission period TNHS although no refresh transmission operation is actually performed. After the alternate communications are terminated, the first refresh transmission operation is performed based on the fixed transmission period TNHS, and after the alternate communications, refresh transmission operations are performed according to the transmission timing delay permission method.

Figure 9:
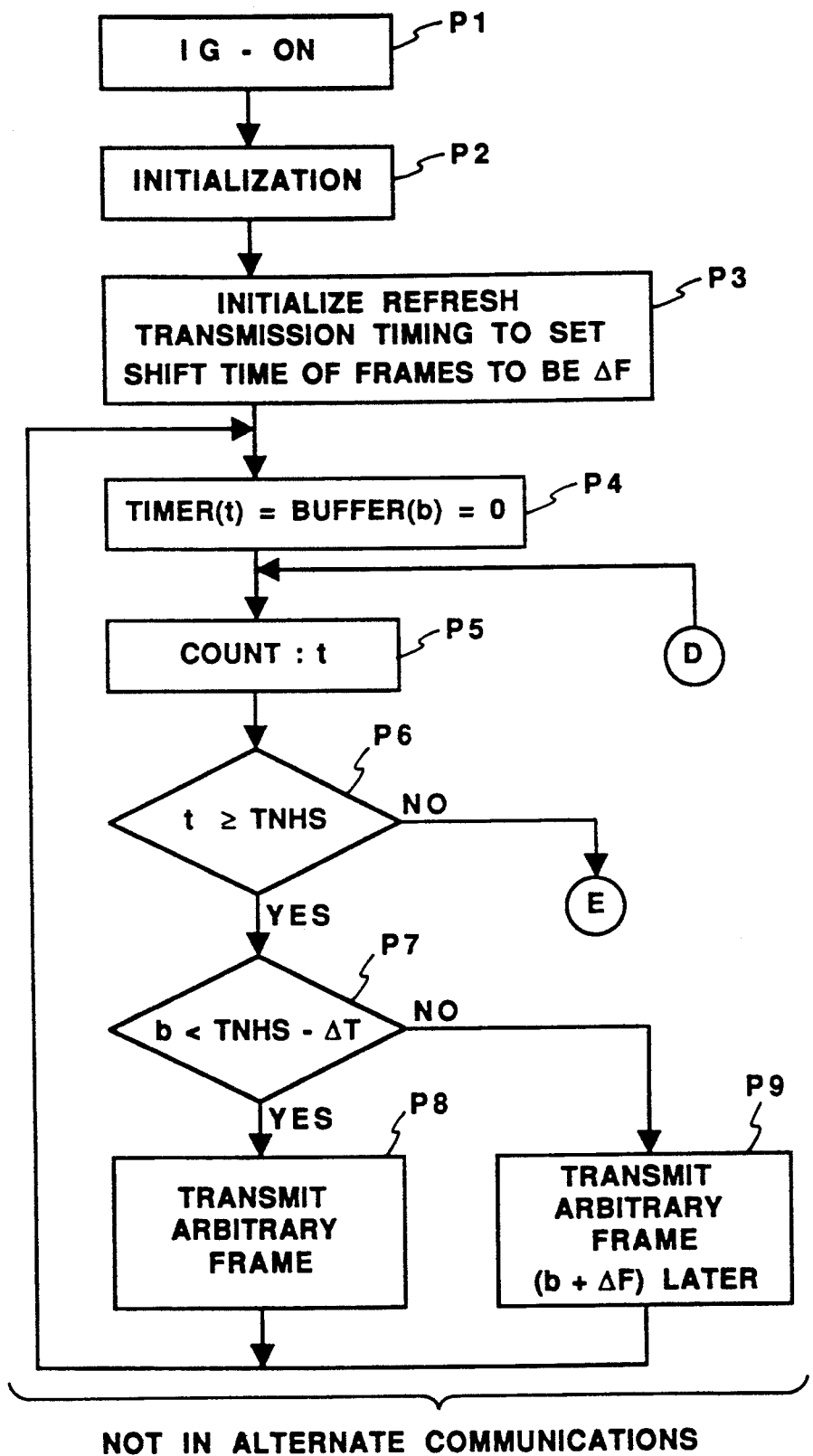
FIGS. 9 and 10 are flow charts showing a refresh transmission sequence of communication nodes that are not involved in the alternate communications.
Figure 10:
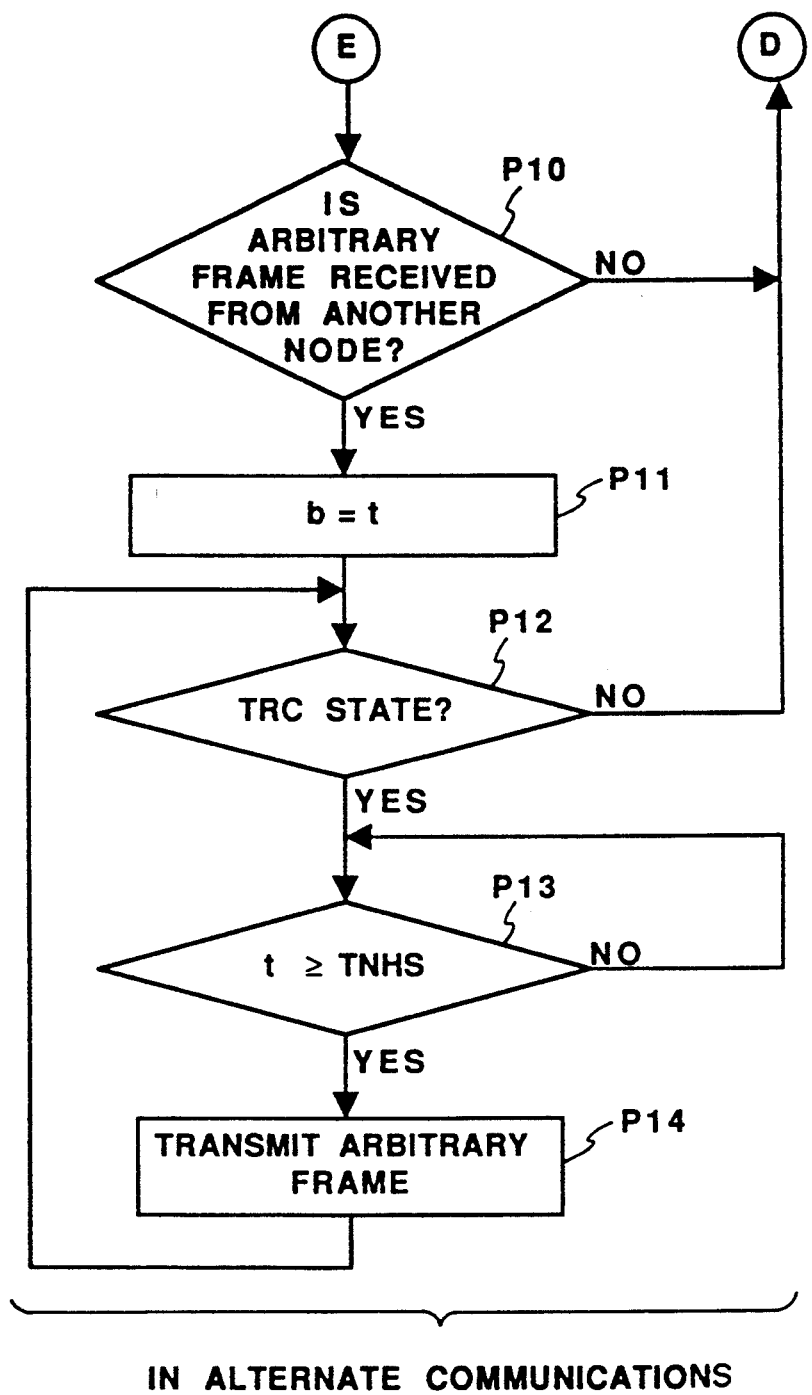

FIGS. 9 and 10 are flow charts showing refresh transmission procedures of a communication node, which is not involved in alternate communications. As for the communication node, which is not involved in alternate communications, the refresh transmission operation before the alternate communications are started (mainly shown in FIG. 9) is the same as that by the communication nodes, which are involved in the alternate communications, and a detailed description thereof will be omitted. Thus, a procedure after the alternate communications are started will be described below.

In the case of the communication node, which is not involved in alternate communications, when a TRC state is set, and the alternate communications are started, the flow advances from step P12 to step P13 in FIG. 10 to check if $t \geq TNHS$ is satisfied. While $t \geq TNHS$ is not satisfied, the flow returns to step P13; otherwise, the flow advances to step P14, and an arbitrary signal frame is transmitted. Thereafter, as long as the alternate communications are continued, the refresh transmission operations are repeated based on the fixed period TNHS. When the alternate communications are terminated, the flow returns from step P12 to step P5, and the first refresh transmission after the alternate communications is also performed based on the fixed period TNHS. Thereafter, refresh transmission operations are performed according to the normal transmission timing delay permission method.

Note that the predetermined transmission period TNHS may be varied in units of nodes. The reference non-transmission time ΔT may be properly set. In this case, different times may be set in units of nodes. When the reference non-transmission time ΔT is assured, at least a time equal to or longer than the reference non-transmission time ΔT need only be assured, and hence, the delay amount of the transmission timing (ΔF in this embodiment) need only be set to be equal to or longer than the reference non-transmission time ΔT. Furthermore, as communication nodes, a plurality of nodes, which perform at least refresh transmission operations, need only be present, and they need not always perform event transmission operations. In addition to these nodes, a node, which performs only an event transmission operation, may be present.

According to the above-mentioned multiplex transmission method, a predetermined reference non-transmission time is set before each refresh transmission operation, and each communication node properly changes the transmission period to assure the reference non-transmission time, thereby delaying the refresh transmission timing. Thus, in principle, the reference non-transmission time can always be assured before each refresh transmission operation and the non-transmission period can be uniformed. In the distributed control system wherein each node manages the transmission timing based on its own clock, the probability of avoiding a transmission disabled or delayed state due to an increase in traffic amount can be increased.

When alternate communications are started, nodes, which are either involved in or not involved in the alternate communications, inhibit a change in transmission period, and use a fixed period. Thus, the correlation among refresh transmission operations of the respective nodes after the alternate communications are terminated can be maintained to be the same as that before the alternate communications, and refresh transmission operations can be continued without being disturbed.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission method, in which time-divisional distributed multiplex transmission operations are performed among a plurality of communication nodes each having a clock for managing its own transmission timing, comprising the steps of:

(a) setting a first predetermined period of time for a refresh transmission operation to be performed at each of said plurality of communication nodes;

(b) setting a second predetermined period of time as a non-transmission time before the refresh transmission operation is started;

(c) detecting whether a transmission operation is performed by self communication node or other communication nodes within the second predetermined period of time;

(d) starting the refresh transmission operation after an elapse of a third predetermined period of time if it is detected in step (c) that the transmission operation is performed, wherein said third predetermined period of time is longer than or equal to the second predetermined period of time and begins at the start of the latest transmission operation performed by said self communication node or said other communication nodes so as to assure the non-transmission time; and (e) starting the refresh transmission operation after an elapse of the second predetermined period of time if it is not detected in step (c) that the transmission operation is performed;

and wherein each of said plurality of communication nodes delays its own refresh transmission period by extending the first predetermined period of time for a period determined by said second and third predetermined periods of time, the determined period is used as an upper limit of a delay time of the refresh transmission operation and the refresh transmission period is delayed once before starting the refresh transmission operation in step (d) even when another transmission operation is performed by said self communication node or said other communication nodes after an elapse of said second predetermined period of time.

2. The method according to claim 1, wherein each of said plurality of communication nodes transmits information in a refresh transmission operation regardless of the presence/absence of a change in content of its own transmission information.

3. The method according to claim 1, wherein a specific node among said plurality of communication nodes serves as a master node to manage the refresh transmission timing.

4. The method according to claim 1, wherein when a refresh transmission operation is performed by another communication node within the non-transmission time, each of said plurality of communication nodes other than said another communication ode delays its own refresh transmission period by a predetermined period of time to assure the non-transmission time.

5. The method according to claim 1, wherein when an event transmission operation is performed by a self or another communication node among said plurality of communication nodes within the non-transmission time, each of said plurality of communication nodes delays its own refresh transmission period by a predetermined period of time to assure the non-transmission time.

6. The method according to claim 1, wherein when inter-communications between arbitrary communication nodes among the plurality of communication nodes are started during the refresh transmission operation, the communication nodes, which are involved in the inter-communications, count a predetermined transmission period of their refresh transmission operations, and the communication nodes, which are not involved in the inter-communications, perform refresh transmission operation while inhibiting the refresh transmission period from being delayed by the predetermined period of time.

7. The method according to claim 6, wherein the communication nodes, which are involved in the inter-communications, count the predetermined transmission period of their refresh transmission operations during the inter-communications, and perform the first refresh transmission operation after termination of the inter-communications at a predetermined inherent period from the last refresh transmission timing in the inter-communications.

8. The method according to claim 6, wherein the communication nodes, which are not involved in the inter-communications, perform refresh transmission operations while inhibiting the refresh transmission period from being delayed by the predetermined period of time, and perform the first refresh transmission operation after termination of the inter-communications at a predetermined inherent period from the last refresh transmission timing in the inter-communications.

* * * * *

UNITED STATES PATENT AND TRADEMARK OFFICE
CERTIFICATE OF CORRECTION

PATENT NO. : 5,289,466
DATED : FEBRUARY 22, 1994
INVENTOR(S) : Yoshikazu NOBUTOKI, et al.

It is certified that error appears in the above-indentified patent and that said Letters Patent is hereby corrected as shown below:

Col. 5, line 26, "$D_1$" should be --D1--.

Col. 12, line 36 (claim 4), "ode" should be --node--.

Signed and Sealed this

First Day of August, 1995

Attest:

BRUCE LEHMAN

*Attesting Officer*  *Commissioner of Patents and Trademarks*